United States Patent
Chitalia et al.

(10) Patent No.: US 12,339,948 B2
(45) Date of Patent: Jun. 24, 2025

(54) METHOD AND SYSTEM FOR INTEGRATING IDENTITY PROVIDER

(71) Applicant: Visa International Service Association, San Francisco, CA (US)

(72) Inventors: Jalpesh Chitalia, Redwood City, CA (US); Manoj Kannembath, San Ramon, CA (US); Amit Kumar Gupta, Dublin, CA (US); Charmaine Han Wen Chan, San Francisco, CA (US); Manjush Gopinatha Menon, San Ramon, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/569,094

(22) PCT Filed: Jun. 22, 2022

(86) PCT No.: PCT/US2022/034566
§ 371 (c)(1),
(2) Date: Dec. 11, 2023

(87) PCT Pub. No.: WO2022/271856
PCT Pub. Date: Dec. 29, 2022

(65) Prior Publication Data
US 2024/0265087 A1     Aug. 8, 2024

Related U.S. Application Data

(60) Provisional application No. 63/213,644, filed on Jun. 22, 2021.

(51) Int. Cl.
*G06F 21/00* (2013.01)
*G06F 21/44* (2013.01)

(52) U.S. Cl.
CPC .................................. *G06F 21/44* (2013.01)

(58) Field of Classification Search
CPC ....................................................... G06F 21/44
See application file for complete search history.

(56) References Cited

U.S. PATENT DOCUMENTS 7,849,020 B2    12/2010   Johnson
11,107,080 B2    8/2021   Malik et al.
(Continued)

OTHER PUBLICATIONS

PCT/US2022/034566 , "International Search Report and Written Opinion", Oct. 19, 2022, 8 pages.
(Continued)

*Primary Examiner* — Rodman Alexander Mahmoudi
(74) *Attorney, Agent, or Firm* — Kilpatrick Townsend & Stockton LLP

(57) ABSTRACT

A method includes a computer receiving a request to conduct an interaction from a mobile device. The computer obtains a computer address and provides the computer address to the mobile device. The mobile device provides an access request to the computer address, and the access request is thereafter routed to an identity provider computer. The identity provider computer identifies identity data associated with the mobile device or a user of the mobile device. The computer obtains the identity data or a derivative of the identity data from the identity provider computer. The computer determines if the identity data or the derivative of the identity data matches previously stored identity data or a previously stored derivative of identity data. If a match is determined, the computer provides a list of user device identifiers to the mobile device.

20 Claims, 7 Drawing Sheets

(56) References Cited

U.S. PATENT DOCUMENTS

| | | | |
|---|---|---|---|
| 2006/0016880 A1 | 1/2006 | Singer et al. | |
| 2009/0328141 A1 | 12/2009 | Zhang et al. | |
| 2014/0351146 A1 | 11/2014 | Johnson et al. | |
| 2015/0215315 A1 | 7/2015 | Gordon et al. | |
| 2017/0278095 A1 | 9/2017 | Heeter et al. | |
| 2019/0020478 A1* | 1/2019 | Girish | H04L 9/3271 |
| 2019/0207913 A1* | 7/2019 | Hwang | H04L 9/0819 |
| 2019/0387051 A1* | 12/2019 | Chen | H04L 67/63 |
| 2021/0035086 A1 | 2/2021 | Khan et al. | |

OTHER PUBLICATIONS

EP22829246.2, "Extended European Search Report", Sep. 11, 2024, 10 pages.

\* cited by examiner

METHOD AND SYSTEM FOR INTEGRATING IDENTITY PROVIDER

CROSS-REFERENCES TO RELATED APPLICATIONS

This application is a National Stage of International Application No. PCT/US2022/034566, filed on Jun. 22, 2022, which claims the benefit of U.S. Provisional Application No. 63/213,644, filed Jun. 22, 2021, which are herein incorporated by reference in their entirety for all purposes.

BACKGROUND

During interactions between users and resource providers, the user can be presented with a list of user device identifiers available for use in the interaction. To obtain the list of user device identifiers, a remote computer can store a cookie in the browser of the user's mobile device. The remote computer can identify the cookie to provide the list of user device identifiers to the mobile device upon request (e.g., via an API call) from the mobile device.

However, by obtaining user devices in this way, the cookies can be changed or deleted, thus making obtaining the list of user device identifiers more difficult or impossible in some situations (e.g., in situations where the mobile device has limited connectivity). Further, some cookies can be obtained from malicious parties or other websites on the Internet, thus increasing privacy and fraud concerns.

Additionally, the user needs to be verified, thus requiring additional user identity verification steps (e.g., generating and confirming a onetime password, having the user login using a username and password, etc.).

Embodiments of the disclosure address this problem and other problems individually and collectively.

SUMMARY

One embodiment is related to a method comprising: receiving, at a computer, a request to conduct an interaction from a mobile device; obtaining, by the computer, a computer address after receiving the request to conduct the interaction; providing, by the computer, the computer address to the mobile device, wherein the mobile device provides an access request to the computer address, the access request thereafter being routed to an identity provider computer, wherein the identity provider computer identifies identity data associated with the mobile device or a user of the mobile device; obtaining, by the computer, the identity data or a derivative of the identity data from the identity provider computer; determining, by the computer, if the identity data or the derivative of the identity data matches previously stored identity data or a previously stored derivative of identity data; and if a match is determined, providing, by the computer, a list of user device identifiers, stored in association with the identity data or the derivative of the identity data, to the mobile device.

Another embodiment is related to a computer comprising: a processor; and a computer-readable medium coupled to the processor, the computer-readable medium comprising code executable by the processor for implementing a method comprising: receiving a request to conduct an interaction from a mobile device; obtaining a computer address after receiving the request to conduct the interaction; providing the computer address to the mobile device, wherein the mobile device provides an access request to the computer address, the access request thereafter being routed to an identity provider computer, wherein the identity provider computer identifies identity data associated with the mobile device or a user of the mobile device; obtaining the identity data or a derivative of the identity data from the identity provider computer; determining if the identity data or the derivative of the identity data matches previously stored identity data or a previously stored derivative of identity data; and if a match is determined, providing a list of user device identifiers, stored in association with the identity data or the derivative of the identity data, to the mobile device.

Another embodiment is related to a method comprising: receiving, by a service provider computer, a computer address request message from a secure remote computer during an interaction between a mobile device and a resource provider computer; generating, by the service provider computer, a computer address, wherein the computer address, when accessed, routes an access request to the service provider computer; obtaining, by the service provider computer, a key that associates the mobile device with the computer address; generating, by the service provider computer, a computer address response message comprising the computer address and the key; and providing, by the service provider computer, the computer address response message to the secure remote computer.

Another embodiment can include a service provider computer programmed to perform the above method.

Further details regarding embodiments of the disclosure can be found in the Detailed Description and the Figures.

BRIEF DESCRIPTION OF THE DRAWINGS

FIG. 4 shows a user experience wireframe for a method according to embodiments.

DETAILED DESCRIPTION

Figure 1:
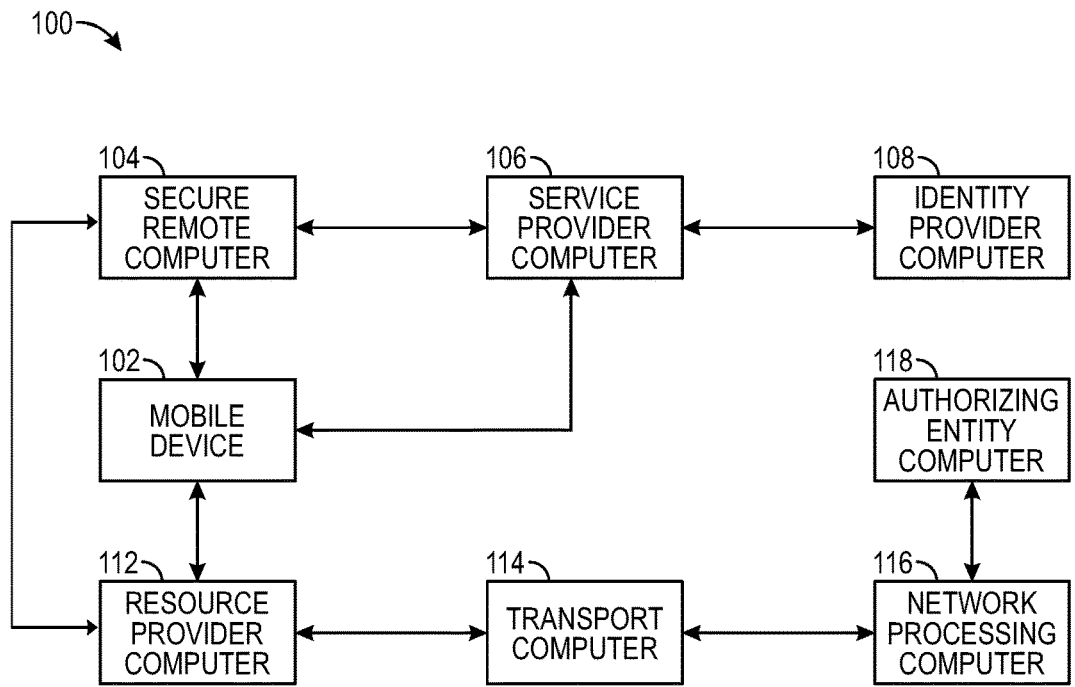
FIG. 1 shows a block diagram of an identity verification system according to embodiments.

Prior to discussing embodiments of the disclosure, some terms can be described in further detail.

A "communication device" may comprise any suitable electronic device that may be operated by a user, which may also provide remote communication capabilities to a network.

A "mobile device" may be an example of a "communication device" that can be easily transported. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile communication devices include mobile phones (e.g. cellular phones), PDAs, tablet computers, net books, laptop computers, personal music players, hand-held specialized readers, etc. Further examples of mobile communication devices include wearable devices, such as smart watches, fitness bands, ankle bracelets, rings, earrings, etc., as well as automobiles with remote communication capabilities.

A "user device" may be a device operated by a user. An example of a user device may be a payment device.

A "user" may include an individual. In some embodiments, a user may be associated with one or more personal accounts and/or mobile devices. The user may also be referred to as a cardholder, account holder, or consumer in some embodiments.

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a payment processing network, or a person. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of payment devices include payment cards, smart media, transponders, and the like. If the payment device is in the form of a debit, credit, or smartcard, the payment device may also optionally have features such as magnetic stripes. Such devices can operate in either a contact or contactless mode.

"Identity data" can include information that represents who or what someone or something is. Identity data can include names, phone numbers, unique identifiers, email addresses, tokens, biometric data, and/or any other data that can be used to identify a user or a device.

A "computer address" can include a location accessible by a computer. a computer address can be a Web address such as a URL.

A "URL" or "uniform resource locator" can include an address of a resource on the Internet. A URL can identify a resource on the Web, such as a HTML page, a CSS document, an image, etc. A URL can include one or more parts. A URL can include a scheme (e.g., HTTP), a domain name, a port, a path to the file, parameters, and/or anchors. A URL can include any additional parts that are utilized to direct a device to a resource on the Web (e.g., a query, a fragment, etc.).

A "credential" may be any suitable information that serves as reliable evidence of worth, ownership, identity, or authority. A credential may be a string of numbers, letters, or any other suitable characters that may be present or contained in any object or document that can serve as confirmation.

A "value credential" may be information associated with worth. Examples of value credentials include payment credentials, coupon identifiers, information needed to obtain a promotional offer, etc.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a payment token may include a series of alphanumeric characters that may be used as a substitute for an original account identifier. For example, a token "4900 0000 0000 0001" may be used in place of a PAN "4147 0900 0000 1234." In some embodiments, a payment token may be "format preserving" and may have a numeric format that conforms to the account identifiers used in existing transaction processing networks (e.g., ISO 8583 financial transaction message format). In some embodiments, a payment token may be used in place of a PAN to initiate, authorize, settle or resolve a payment transaction or represent the original credential in other systems where the original credential would typically be provided. In some embodiments, a payment token may be generated such that the recovery of the original PAN or other account identifier from the token value may not be computationally derived. Further, in some embodiments, the token format may be configured to allow the entity receiving the token to identify it as a token and recognize the entity that issued the token.

A "resource provider" may be an entity that can provide a resource such as goods, services, information, and/or access. Examples of resource providers includes merchants, data providers, transit agencies, governmental entities, venue and dwelling operators, etc.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be referred to as a "transport computer".

An "authorizing entity" may be an entity that authorizes a request. Examples of an authorizing entity may be an issuer, a governmental agency, a document repository, an access administrator, etc.

An "issuer" may typically refer to a business entity (e.g., a bank) that maintains an account for a user. An issuer may also issue payment credentials stored on a user device, such as a cellular telephone, smart card, tablet, or laptop to the consumer.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

Embodiments of the disclosure allow for determining and providing a list of user device identifiers to a user operated mobile device during an interaction based on identity data of the user and/or mobile device, without the need to use cookies.

FIG. 1 shows a system 100 according to embodiments of the disclosure. The system 100 comprises a mobile device 102, a secure remote computer 104, a service provider computer 106, an identity provider computer 108, a resource provider computer 112, a transport computer 114, a network processing computer 116, and an authorizing entity computer 118.

The mobile device 102 can be in operative communication with the secure remote computer 104, the service provider computer 106, and the resource provider computer 112. The secure remote computer 104 can be in operative communication with the mobile device 102, the resource provider computer 112, and the service provider computer 106. The service provider computer 106 can be in operative communication with the identity provider computer 108. The resource provider computer 112 can be in operative communication with the transport computer 114. The transport computer 114 can be in operative communication with the network processing computer 116, which can be in operative communication with the authorizing entity computer 118.

For simplicity of illustration, a certain number of components are shown in FIG. 1. It is understood, however, that embodiments of the invention may include more than one of each component. In addition, some embodiments of the invention may include fewer than or greater than all the components shown in FIG. 1.

Messages between the devices in the system 100 can be transmitted using a secure communications protocols such as, but not limited to, File Transfer Protocol (FTP); Hyper-Text Transfer Protocol (HTTP); Secure Hypertext Transfer Protocol (HTTPS), SSL, ISO (e.g., ISO 8583) and/or the like. The communications network may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The mobile device 102 can include a device that can be moved around by a user. As an example, a mobile device 102 can be hand-held and compact so that it can fit into a consumer's pocket (e.g., pocket-sized), backpack, purse, etc. The mobile device 102 can include cellular phones, keychain devices, personal digital assistants (PDAs), pagers, notebooks, laptops, notepads, wearable devices (e.g., smart watches, fitness bands, jewelry, etc.), automobiles with remote communication capabilities, personal computers, payment cards (e.g., smart cards, magnetic stripe cards, etc.), and the like. The mobile device 102 can be associated with a consumer or a user. In some embodiments, the mobile device 102 can include a mobile application (e.g., a payment application, a digital wallet application, etc.) stored in a memory or secure element of the mobile device 102.

The secure remote computer 104 can include a secure computer that is located remotely from the mobile device 102. The secure remote computer 104 can determine one or more user devices associated with a user that is operating the mobile device 102. The secure remote computer 104 can operate in conjunction with the service provider computer 106 to obtain identity data for a mobile device in order to determine the one or more user devices.

The service provider computer 106 can include a computer that provides an identity service. The service provider computer 106 can provide the identity service to the secure remote computer 104. The service provider computer 106 can aid the secure remote computer 104 in obtaining identity data from the identity provider computer 108, which may be one identity provider computer of a plurality of identity provider computers.

In some embodiments, a server computer can comprise the secure remote computer 104 and the service provider computer 106 as components of the server computer.

The identity provider computer 108 can include a computer that maintains identities. The identity provider computer 108 can store identity data related to the user of the mobile device 102. The identity provider computer 108 can provide the identity data or a derivative thereof to the service provider computer 106 upon request. The identity provider computer 108 can provide identity data such as a phone number, user address, etc. associated with the mobile device 102 or the user of the mobile device 102 to the service provider computer 106. In some embodiments, the identity provider computer 108 can be a wireless carrier computer that maintains wireless mobile phone connections for the mobile device 102 and a plurality of other mobile devices. Other examples of identity providers include financial institutions, governmental agencies, etc.

The resource provider computer 112 can include a computer that offers access to one or more resources. The resource provider computer 112 may be configured to receive and process interaction data. The interaction data may be received from the mobile device 102 or an access device (not shown) in communication with the mobile device 102. The resource provider computer 112 may engage in interactions, sell goods or services, or provide access to goods or services to users. The resource provider computer 112 may accept interaction data in multiple forms and may use multiple tools to conduct different types of interactions.

The transport computer 114 can include a system for an entity (e.g., a bank) that maintains data on behalf of a particular resource provider or other entity. The transport computer 114 may route authorization request messages for the resource provider computer 112 to the authorizing entity computer 118 via the network processing computer 116. In some cases, the transport computer 114 may be known as an acquirer computer.

The network processing computer 116 can include data processing subsystems, wired or wireless networks, including the Internet. An example of the network processing computer 116 includes VisaNet™, operated by Visa®. Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. The network processing computer 116 may be a server computer. In some implementations, the network processing computer 116 may forward an authorization request received from the transport computer 114 to the authorizing entity computer 118 via a communication channel. The network processing computer 116 may further forward an authorization response message received from the authorizing entity computer 118 to the transport computer 114.

The authorizing entity computer 118 can include a computer that may have issued an account and/or the user devices to the user of the mobile device 102. The authorizing entity computer 118 can be configured to authorize or not authorize an interaction between a user of the mobile device 102 and a resource provider of the resource provider computer using a user device selected on the mobile device 102.

Figure 2:
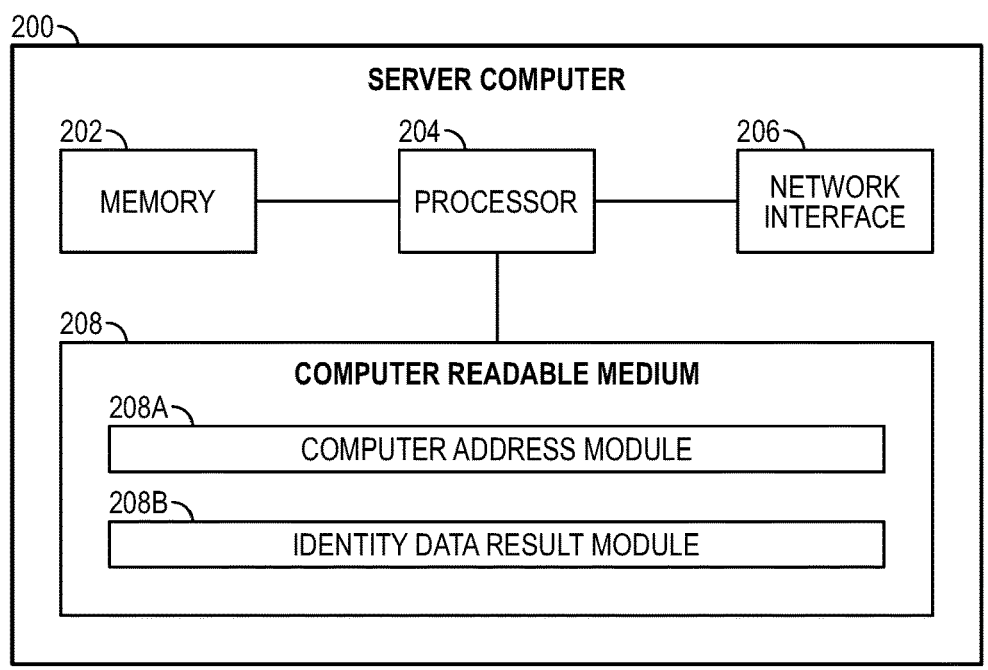
FIG. 2 shows a block diagram of components of a server computer according to embodiments.

FIG. 2 shows a block diagram of a server computer 200 according to embodiments. The exemplary server computer 200 may comprise a processor 204. The processor 204 may be coupled to a memory 202, a network interface 206, and a computer readable medium 208. The computer readable medium 208 can comprise a computer address module 208A and an identity data result module 208B.

The server computer 200 can include the secure remote computer 104. In some embodiments, the server computer 200 can include both the secure remote computer 104 and the service provider computer 106.

The memory 202 can be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device. For example, the memory 202 can store keys, identity data, derivatives of identity data, etc.

The computer readable medium 208 may comprise code, executable by the processor 204, for performing a method comprising: receiving, at a computer, a request to conduct an interaction from a mobile device; obtaining, by the computer, a computer address after receiving the request to conduct the interaction; providing, by the computer, the computer address to the mobile device, wherein the mobile device provides an access request to the computer address, wherein the access request is thereafter routed to an identity provider computer, wherein the identity provider computer identifies identity data associated with the mobile device or a user of the mobile device; obtaining, by the computer, the identity data or a derivative of the identity data from the identity provider computer; determining, by the computer, if the identity data or the derivative of the identity data matches previously stored identity data or a previously stored derivative of identity data; and if a match is determined, providing, by the computer, a list of user device identifiers, stored in association with the identity data or the derivative of the identity data, to the mobile device.

The computer address module 208A may comprise code or software, executable by the processor 204, for obtaining a computer address. The computer address module 208A, in conjunction with the processor 204, can obtain a unique computer address for a mobile device. The computer address can be constructed to route an accessor (e.g., a mobile device) to a resource maintained on the Web. The computer address module 208A, in conjunction with the processor 204, can generate a computer address such as a URL.

In some embodiments, if the secure remote computer and the service provider computer can be included within a single computer, then the computer address module 208A, in conjunction with the processor 204, can generate or obtain the computer address. For example, the computer address module 208A, in conjunction with the processor 204, can store computer addresses that link to resources maintained on the Web. The computer address module 208A, in conjunction with the processor 204, can determine a stored computer address that links to a web resource that can route data to a particular identity service provider.

In other embodiments, the computer address module 208A, in conjunction with the processor 204, can generate a computer address request message. The server computer 200, which can be the secure remote computer 104 can provide the computer address request message to a service provider computer that generates the computer address. The computer address module 208A, in conjunction with the processor 204, can receive the computer address as well as a key (e.g., an association key) from the service provider computer.

The identity data result module 208B may comprise code or software, executable by the processor 204, for obtaining identity data and/or derivatives thereof. The identity data result module 208B, in conjunction with the processor 204, can generate an identity data result request message comprising the key. The identity data result module 208B, in conjunction with the processor 204, can provide the identity data result request message to the service provider computer. The identity data result module 208B, in conjunction with the processor 204, can receive an identity data result response message comprising the identity data or the derivative of the identity data.

The network interface 206 may include an interface that can allow the server computer 200 to communicate with external computers. The network interface 206 may enable the server computer 200 to communicate data to and from another device (e.g., the mobile device 102, the service provider computer 106, the identity provider computer 108, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Embodiments can use the systems and apparatuses described herein to at least verify a user's identity data. The user's identity data can be utilized to determine one or more user devices associated with the user during an interaction, without the need to rely on cookies. FIGS. 3-6 describe some examples of such methods.

Figure 3:
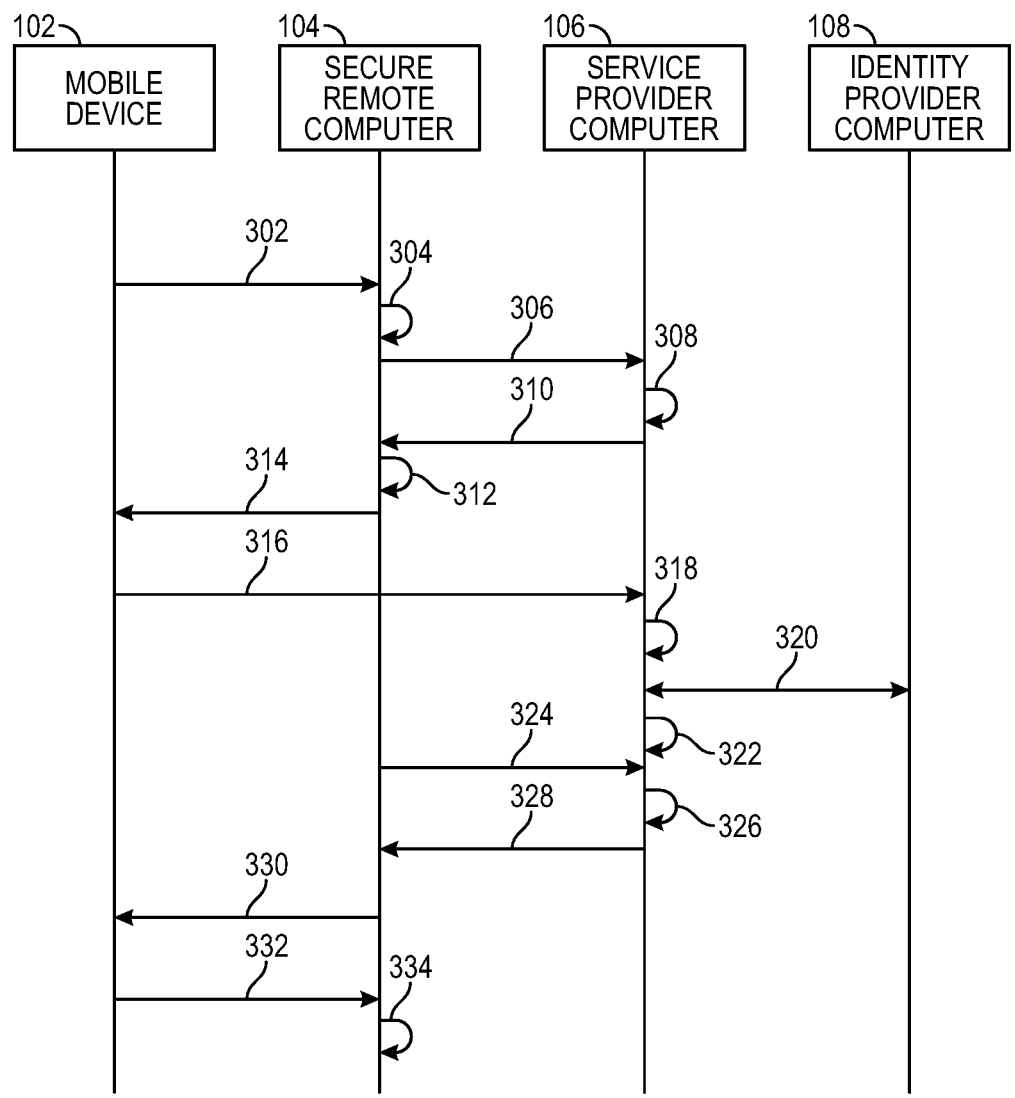
FIG. 3 shows a flow diagram illustrating a method according to embodiments.

FIG. 3 shows a flow diagram illustrating a method according to embodiments. The method illustrated in FIG. 3 can be described in the context of enrolling a mobile device's identity data (e.g., a phone number) in an identity verification system during an interaction such as a payment transaction. It is understood, however, that the invention can be applied to other circumstances.

At step 302, a mobile device 102 can provide identity data to a secure remote computer 104 during an interaction between the mobile device 102 and a resource provider computer (not shown). The secure remote computer 104 can receive the user submitted identity data (e.g., a phone number) from a mobile browser interacting with a Web site, or application on the mobile device 102. As an example, in the browser or application, the user of the mobile device 102 can select an option to add a user device (e.g., a payment card) to a digital wallet. The user enters the identity data into the mobile browser or the application, or identity data is obtained from a secure element on the mobile device 102 and is entered into the mobile browser or the application.

At step 304, the secure remote computer 104 can generate an identity data message. The identity data message can include the identity data (e.g., a phone number) obtained from the mobile device 102. For example, the secure remote computer can generate an identity data message comprising the phone number or a MSISDN (mobile station international subscriber directory number). In addition, in some embodiments, a session identifier may be generated by the secure remote computer 104, and may be added to the identity data message, and it can be included in all subsequent messages so that the computers in the network can associate the messages to a particular interaction.

At step 306, the secure remote computer 104 can send the identity data message to a service provider computer 106. In some embodiments, the secure remote computer 104 can send the identity data message to the service provider computer 106 via a specific URL for the service provider computer 106.

In some embodiments, the service provider computer 106 may be an aggregator for requests from the secure remote computer 104 and can be a gateway to many different identity provider computers (e.g., one of which may be identity provider computer 108). However, in some embodiments, the functionality of the secure remote computer 104 and the service provider computer 106 can be included in a single server computer.

At step 308, after receiving the identity data (e.g., the user's phone number) from the secure remote computer 104, the service provider computer 106 can obtain a computer address such as a URL for the service provider computer 106, and a key. The computer address can be a uniquely generated computer address for the mobile device 102 to communicate with the service provider computer 106. In some embodiments, the computer address can utilize an extended validation certificate. In some embodiments, the key can be an association key that can be utilized by the computers in the system to reference the mobile device 102.

At step 310, the service provider computer 106 can generate and provide a response message comprising the computer address for the service provider computer 106 and the key to the secure remote computer 104.

At step 312, after receiving the response message, the secure remote computer 104 can store the key, which can later be used for communication when referencing the same mobile device 102. They key can be stored with data (e.g., an IP address of the phone, session ID, etc.) that allows the secure remote computer 104 to communicate with the mobile device 102.

At step 314, the secure remote computer 104 can provide the computer address for the service provider computer 106 to the mobile device 102. In some embodiments, the secure remote computer 104 can invoke the computer address from the browser or the application on the mobile device 102.

At step 316, after receiving the computer address for the service provider computer 106, the mobile browser or the application on the mobile device 102 can provide an access request to the service provider computer 106 using the computer address for the service provider computer 106. For example, the mobile device 102 can send an HTTPS GET message to the computer address for the service provider computer 106 to access the service provider computer 106.

At step 318, the service provider computer 106 can receive the access request from the mobile device 102 and can determine which identity provider computer 108 of a plurality of identity provider computers to which the access request should be routed. In some embodiments, the access request can include header data (e.g., data included in an HTTP header). The service provider computer 106 can determine an identity provider computer of the plurality of identity provider computers based on an identity provider computer identifier included in the header data. The identity provider computer identifier can be included in the header data, since the mobile device 102 can be maintained and/or issued by the identity provider computer 108, thus allowing software installed on the mobile device 102 to insert header data for the identity provider computer 108 into computer address access requests.

At step 320, the service provider computer 106 can route the access request from the mobile device 102 to the appropriate identity provider computer 108. The service provider computer 106 can identify a computer address for the identity provider computer 108 using the identity provider computer identifier in the header data. In this regard, the service provider computer can have a table that correlates identity provider computer identifiers with identity provider computer addresses.

The identity provider computer 108 can then determine identity data associated with the mobile device that is stored by the identity provider computer 108 in a database. For example, the identity provider computer 108 can access a database that stores mobile device identifiers (e.g., mobile device public keys, SIM card numbers, hardware identifiers, etc.) in association with mobile device identity data. The identity data can include, for example, a phone number. In some embodiments, the mobile device identifier(s) used to identify the identity data may have been retrieved by the identity provider computer 108 directly from the mobile device 102 when they are in communication with each other. In other embodiments, the mobile device identifier(s) may have been received in the above described header data, or it may also have been in the above described access request.

Once the identity data is obtained by the identity provider computer 108, it can provide the identity data to the service provider computer 106.

At step 322, in some embodiments, after receiving the identity data from the identity provider computer 108, the service provider computer 106 can determine a derivative of the identity data. For example, if the service provider computer 106 receives the phone number from the identity provider computer 108, then the service provider computer 106 can hash (e.g., using a hash algorithm such as SHA-1) the phone number to determine a derivative of the identity data. The service provider computer 106 may store the identity data and/or the derivative of the identity data.

At step 322, after receiving the identity data from the identity provider computer 108, in some embodiments, the service provider computer 106 can verify that the identity data (or derivative thereof) received from the identity provider computer 108 is the same as the identity data received from the mobile device during steps 302-306. In some embodiments, the service provider computer 106 can store the identity data or the derivative thereof.

At step 324, after waiting for an appropriate amount of time or in response to a notification from the service provider computer 106 that the identity data or derivative thereof has been obtained, the secure remote computer 104 can generate and provide an identity data result request message comprising the key (e.g., an association key). By including the key in the identity data result request message, the secure remote computer 104 can request the identity data for the same mobile device 102 from which the initial request message was received at step 302. As an example, the secure remote computer 104 can provide the identity data result request message as an API call to the service provider computer 106.

At step 326, after receiving the identity data result request message, the service provider computer 106 can determine the identity data or the derivative of the identity data stored in association with the key in a database. For example, the secure remote computer 104 can look up the key in the database to determine the identity data or the derivative of the identity data.

At step 328, the service provider computer 106 can generate and provide an identity data result response message comprising the identity data or the derivative of the identity data to the secure remote computer 104 in response to the identity data result request message.

At step 330, the secure remote computer 104 can send an option to enroll to the mobile device 102. The option to enroll can be an option to enroll in a "remember me" service, for example. The user of the mobile device 102 may then select the option to enroll in the "remember me" service. For example, the secure remote computer 104 can prompt the user of the mobile device 102 to enroll in an identity data storage and verification system.

At step 332, the mobile device 102 can provide the user's selection of whether or not to enroll to the secure remote computer 104. In some embodiments, if the user decides not to enroll, then the mobile device 102 may not send an enrollment response message to the secure remote computer 104. In such a case, the secure remote computer 104 can determine that the user does not aim to enroll after a period of time has passed without receiving the enrollment response message.

At step 334, after receiving the user's selection of whether or not to enroll, the secure remote computer 104 can store the mobile phone identity data or the derivative thereof in a user database (e.g., in a directory) along with other data that identifies the user (e.g., a user identifier), if the user wants to enroll. The user identifier can be a GUID (global unique identifier) that is assigned to the user. Further, the secure remote computer 104 can store the user's user device(s) in association with the identity data or the derivative thereof and the GUID.

In some embodiments, at step 330, the secure remote computer 104 retrieves a list of user device identifiers (e.g., payment card identifiers) that are associated with the stored mobile phone number of derivative thereof, and this list is presented to the user via the mobile device 102 with the mobile browser or the application.

The user may conduct a transaction at the resource provider (e.g., a merchant) using the mobile device 102 by selecting one of the user device identifiers. The transaction may be a payment transaction (e.g., for the purchase of a good or service), an access transaction (e.g., for access to a transit system), or any other suitable transaction. The user may indicate payment account information to the resource provider electronically, such as in an online transaction.

With reference to FIG. 1, in order to authorize a transaction, an authorization request message with the selected user device identifier may be generated by the resource provider computer 112 and then forwarded to the transport computer 114 (e.g., operated by an acquirer). After receiving the authorization request message, the authorization request message is then sent to the network processing computer 116. The network processing computer 116 then forwards the authorization request message to the corresponding authorizing entity computer 118 associated with an authorizing entity associated with the user's payment account.

After the authorizing entity computer 118 receives the authorization request message, the authorizing entity computer 118 sends an authorization response message back to the network processing computer 116 to indicate whether the current transaction is authorized (or not authorized). The network processing computer 116 then forwards the authorization response message back to the transport computer 114. In some embodiments, network processing computer 116 may decline the transaction even if the authorizing entity computer 118 has authorized the transaction, for example depending on a value of the fraud risk score. The transport computer 114 then sends the response message back to the resource provider computer 112.

After the resource provider computer 112 receives the authorization response message, the resource provider computer 112 may then provide the authorization response message to the user. For example, the resource provider computer may provide a web page or other indication of the authorization response message as a virtual receipt. The receipts may include transaction data for the transaction.

At the end of the day, a normal clearing and settlement process can be conducted by the network processing computer 116. A clearing process is a process of exchanging financial details between an acquirer and an authorizing entity to facilitate posting to a user's payment account and reconciliation of the user's settlement position.

Figure 4:
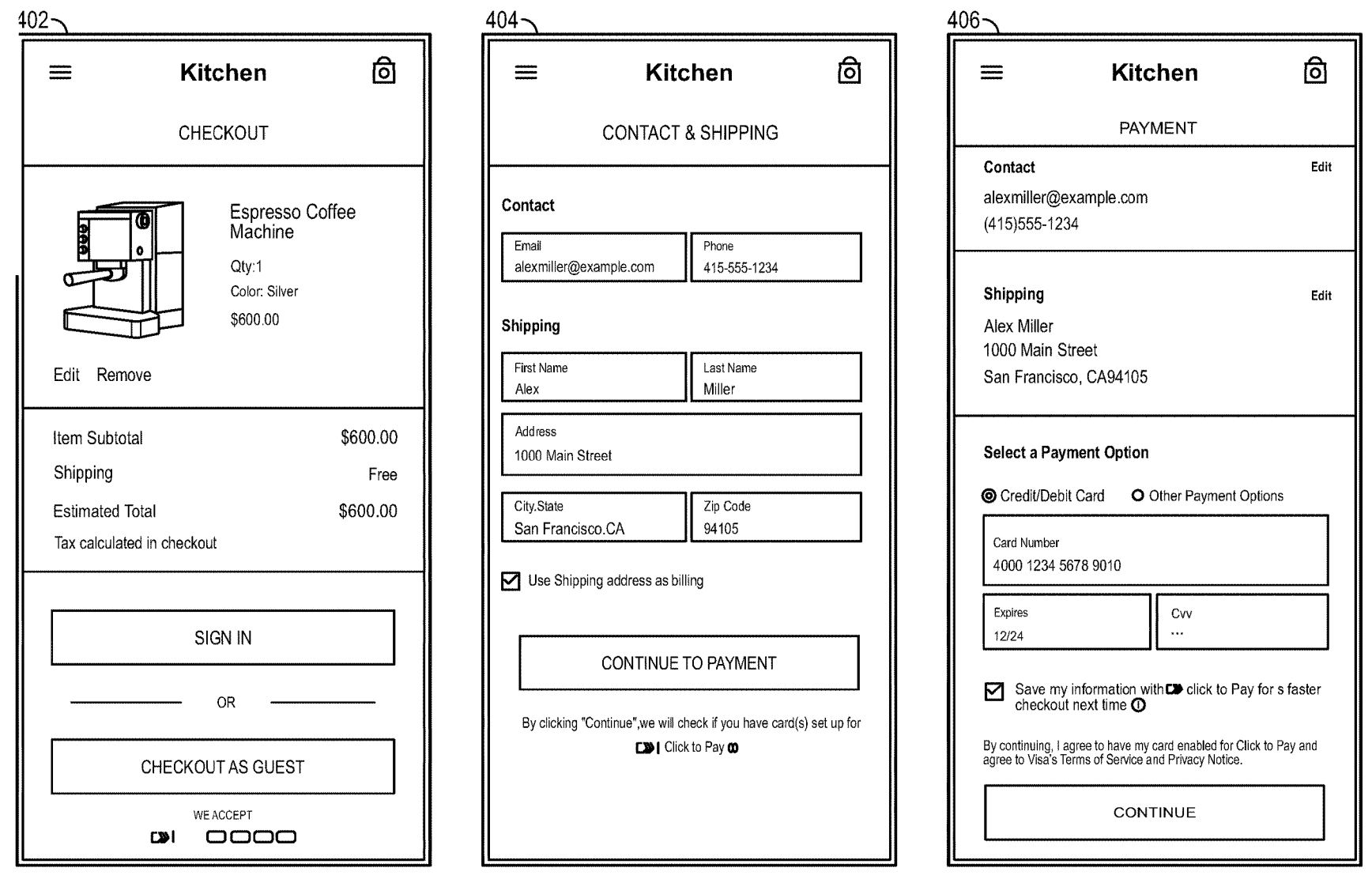
Figure 4:
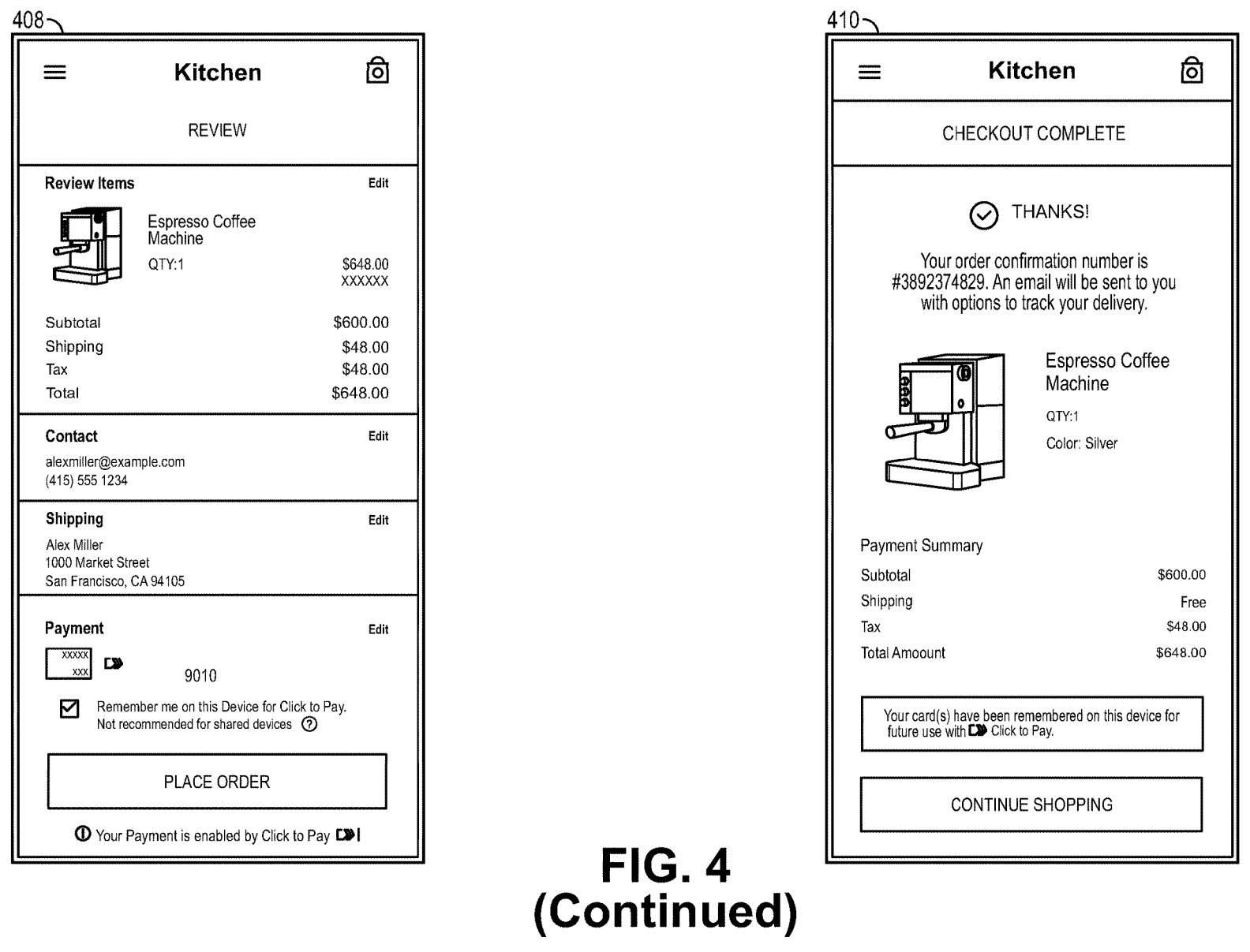

FIG. 4 shows a user experience wireframes that may be used in some of the steps in the methods described above with respect to FIG. 3. FIG. 4 illustrates wireframes 402-410 that represent the user experience presented to the user of the mobile device 102 during the method as illustrated in reference to FIG. 3.

The wireframe 402 illustrates an initial checkout screen that is presented to the user when the user selects to check out with selected resources on a webpage maintained by a resource provider computer. The user is presented with options to sign in or to checkout as guest. If the user selects to checkout as guest, the user can then be presented with the wireframe 404.

The wireframe 404 illustrates an information input screen that is present to the user when the user of the mobile device selects to "checkout as guest" or creates an account. The user can input personal information, such as email address, phone number, first name, last name, address, city, state, zip code, etc., into the mobile device.

The wireframe 406 illustrates an interaction type input screen that is presented to the user after the user inputs personal information in the screen illustrated in the wireframe 404. The user can select a type of interaction (e.g., a credit interaction, a debit interaction, etc.). The user can also input in user device information including a card number, an expiry date, a code verification value (CVV), and/or any other information related to the user device. Upon selecting "continue," the input data can be provided to a secure remote computer 104. For example, the secure remote computer 104 can receive the user submitted identity data (e.g., a phone number) from a mobile browser or application on the mobile device 102, as described in reference to step 302 illustrated in FIG. 3.

The wireframe 408 illustrates an enrollment option screen including an option provided to the user of the mobile device to enroll (e.g., "Remember me on this Device . . . "). The enrollment option screen can be presented to the user on the mobile device 102 after step 330 as illustrated in FIG. 3. The user can select to enroll with the secure remote computer 104 in an identity data storage and verification system. The user can also be presented with an option to continue with the interaction (e.g., via a "place order" button).

The wireframe 410 illustrates an interaction confirmation screen that indicates to the user of the mobile device that the interaction has been completed and authorized by an authorizing entity computer.

Figure 5:
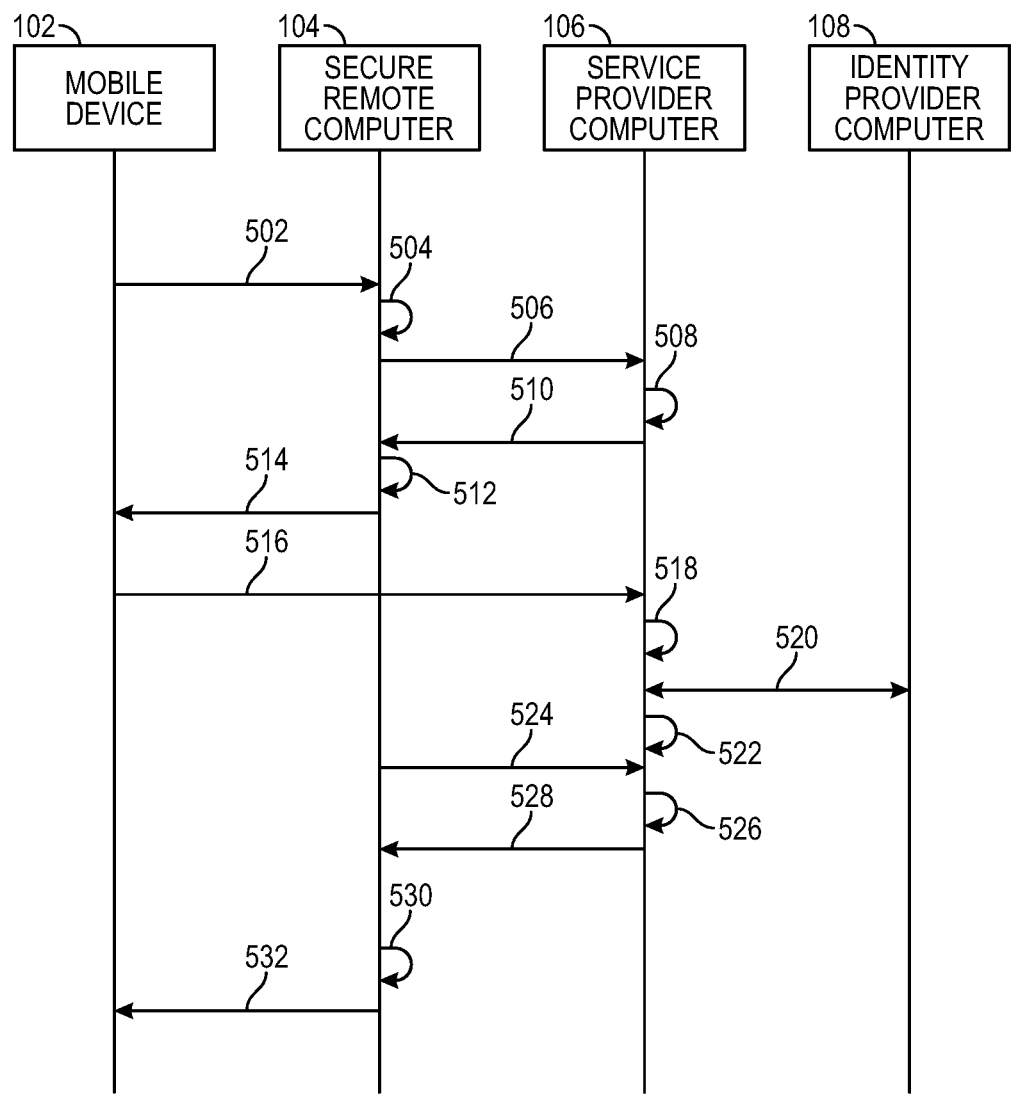
FIG. 5 shows a flow diagram illustrating a user verification method according to embodiments.

FIG. 5 shows a flow diagram illustrating a user verification method according to embodiments. The method illustrated in FIG. 5 will be described in the context of a verifying a mobile device's identity data (e.g., a phone number) during an interaction. It is understood, however, that the invention can be applied to other circumstances.

Prior to step 502, a user operating the mobile device 102 can initiate an interaction in a digital wallet, in a mobile browser, or in an application on the mobile device 102 to perform an interaction with a resource provider of a resource provider computer.

At step 502, the mobile device can generate and provide a request to conduct an interaction with a resource provider computer (not shown) in communication with the secure remote computer 104. Unlike during the enrollment process in FIG. 3 at step 302, the user or the mobile device 102 does not need provide identity data to the secure remote computer 104 in step 502 of FIG. 5.

After receiving the request to conduct the interaction, the secure remote computer 104, or a server computer comprising the functionality of the secure remote computer 104 and the service provider computer 106, can obtain a computer address for the service provider computer 106. Some example steps in obtaining the computer address for the service provider computer 106 are described in steps 504-510.

At step 504, the secure remote computer 104 can generate a computer address request message that requests a computer address for the service provider computer 106, which will eventually be provided to the mobile device 102. In addition, in some embodiments, a session identifier may be generated by the secure remote computer 104, and may be added to the identity data message, and it can be included in all subsequent messages so that the computers in the network can associate the messages.

At step 506 (similar to step 306 in FIG. 3), the secure remote computer 104 can send the computer address request message to the service provider computer 106. The secure remote computer 104 can provide the computer address request message to the service provider computer 106 via a specific URL for the service provider computer 106.

At step 508 (similar to step 308 in FIG. 3), after receiving the computer address request message, the service provider computer 106 can generate or obtain a computer address and a key for the mobile device 102. The computer address can be for the service provider computer 106 and is unique to the mobile device 102. In some embodiments, the computer address can utilize an electronic certificate validation process. The key can be an association key that is used to reference the mobile device 102.

At step 510 (similar to step 310 in FIG. 3), after obtaining the computer address and the key, the service provider computer 106 can send the computer address and the key to the secure remote computer 104.

At step 512 (similar to step 512 in FIG. 3), after receiving the computer address and the key, the secure remote computer 104 can store the key in a database. The secure remote computer 104 can store the key in association with information identifying the communication channel between the mobile device 102 and the secure remote computer 104 and/or information identifying the mobile device 102 itself.

At step 514 (similar to step 314 in FIG. 3), the secure remote computer 104 can provide the computer address for the service provider computer 106 to the mobile device 102. In some embodiments, the secure remote computer 104 can invoke the computer address for the service provider computer 106 from the browser and/or application installed on the mobile device 102.

At step 516 (similar to step 316 in FIG. 3), the mobile browser or the application on the mobile device 102 can provide an access request to the computer address of the service provider computer 106. In some embodiments, the access request can be an HTTP GET message on the computer address to access the web resource located by the computer address. The computer address can bring the mobile device 102 to a web resource, identified by the computer address, hosted on the web by the service provider computer 106.

At step 518 (similar to step 318 in FIG. 3), after receiving the access request to access the computer address from the mobile device 102, the service provider computer 106 can determine the identity provider computer 108 from a plurality of identity provider computers. The service provider computer 106 can determine which identity provider computer of the plurality of identity provider computers maintains identity data associated with the mobile device or a user of the mobile device.

The service provider computer 106 can determine the identity provider computer 108 from the plurality of identity provider computers. As explained above in step 318 in FIG. 3, service provider computer 106 can receive the access request from the mobile device 102 and can determine which identity provider computer 108 of a plurality of identity provider computers to which the access request should be routed. In some embodiments, the access request can include header data (e.g., data included in an HTTP header). The service provider computer 106 can determine an identity provider computer of the plurality of identity provider computers based on an identity provider computer identifier included in the header data. The identity provider computer identifier can be included in the header data, since the mobile device 102 can be maintained and/or issued by the identity provider computer 108, thus allowing software installed on the mobile device 102 to insert header data for the identity provider computer 108 into computer address access requests.

At step 520, the service provider computer 106 can route the access request to an identity provider computer 108 and can communicate with the identity provider computer 108 regarding the identity data associated with the mobile device or a user of the mobile device 102. For example, the identity provider computer 108 can be a mobile wireless carrier computer. The service provider computer 106 can route the request to the mobile wireless carrier computer. The mobile wireless carrier computer can return identity data (e.g., a phone number) or a derivative thereof (e.g., a hash of the phone number). In some embodiments, if the service provider computer 106 receives the mobile phone number from the mobile wireless carrier computer, then the service provider computer 106 can hash the phone number. As such the service provider computer 106 can determine the derivative of the identity data from the identity data. In some embodiments, the derivative of the identity data can be an identity data token that is generated from the identity data. Further details regarding step 520 are in step 320 in FIG. 3 above.

In some embodiments, the identity provider computer 108 can determine the identity data based on an IP address that is used to connect to the computer address and included when accessing a web resource.

At step 522 (similar to step 322 in FIG. 3 above), after receiving the identity data from the service provider computer 106, the service provider computer 106 can store the identity data or the derivative of the identity data in a database. The service provider computer 106 can store the identity data or the derivative of the identity data in the database in association with the key.

In some embodiments, storing the identity data in the database can be temporary and may be stored only for the duration of the current interaction. Doing so aids in limiting any potential data breach which could expose the identity data.

At step 524 (similar to step 324 in FIG. 3 above), at a suitable point in time after providing the computer address to the mobile device 102, the secure remote computer 104 can generate and provide an identity data result request message comprising the key to the service provider computer 106.

At step 526 (similar to step 326 in FIG. 3 above), after receiving the identity data result request message, the service provider computer 106 can look up the key in the database to determine the identity data or the derivative of the identity data stored in association with the key.

At step 528, (similar to step 328 in FIG. 3 above) after receiving the identity data or the derivative of the identity data, the service provider computer 106 can generate and provide an identity data result response message to the secure remote computer. The identity data result response message can comprise the identity data or the derivative of the identity data.

At step 530 (similar to step 330 in FIG. 3 above), after receiving the identity data or the derivative of the identity data, the secure remote computer 104 can determine if the identity data or the derivative of the identity data matches previously stored identity data or a previously stored derivative of identity data (e.g., stored during enrollment at step 334 of FIG. 3). If a match is determined, the secure remote computer 104 can obtain a list of user device identifiers that are stored in association with the identity data or the derivative of the identity data in the database.

At step 532 (similar to step 332 in FIG. 3 above), the secure remote computer retrieves the list of user device identifiers (e.g., payment card identifiers) that are associated with the stored mobile phone number of derivative thereof, and this list is presented to the user via the mobile device 102 with the mobile browser or application.

With reference to FIG. 1, the user may conduct a transaction at the resource provider (e.g., a merchant) using a mobile device 102 by selecting one of the user devices with which to conduct the transaction. The transaction may be a payment transaction (e.g., for the purchase of a good or service), an access transaction (e.g., for access to a transit system), or any other suitable transaction. The user may indicate payment account information to the resource provider electronically, such as in an online transaction. In some cases, the mobile device 102 may transmit to the resource provider computer an account identifier, such as a user device token.

In order to authorize a transaction, an authorization request message may be generated by the resource provider computer 112 and then forwarded to the transport computer 114 (e.g., operated by an acquirer). After receiving the authorization request message, the authorization request message is then sent to the network processing computer 116. The network processing computer 116 then forwards the authorization request message to the corresponding authorizing entity computer 118 associated with an authorizing entity associated with the user's payment account.

After the authorizing entity computer 118 receives the authorization request message, the authorizing entity computer 118 sends an authorization response message back to the network processing computer 116 to indicate whether the current transaction is authorized (or not authorized). The network processing computer 116 then forwards the authorization response message back to the transport computer 114. In some embodiments, network processing computer 116 may decline the transaction even if the authorizing entity computer 118 has authorized the transaction, for example depending on a value of the fraud risk score. The transport computer 114 then sends the response message back to the resource provider computer 112.

After the resource provider computer 112 receives the authorization response message, the resource provider computer 112 may then provide the authorization response message to the user. For example, the resource provider computer may provide a web page or other indication of the authorization response message as a virtual receipt. The receipts may include transaction data for the transaction.

At the end of the day, a normal clearing and settlement process can be conducted by the network processing computer 116. A clearing process is a process of exchanging financial details between an acquirer and an authorizing entity to facilitate posting to a user's payment account and reconciliation of the user's settlement position.

Figure 6:
FIG. 6 shows a user experience wireframe for a user verification method according to embodiments.
Figure 6:
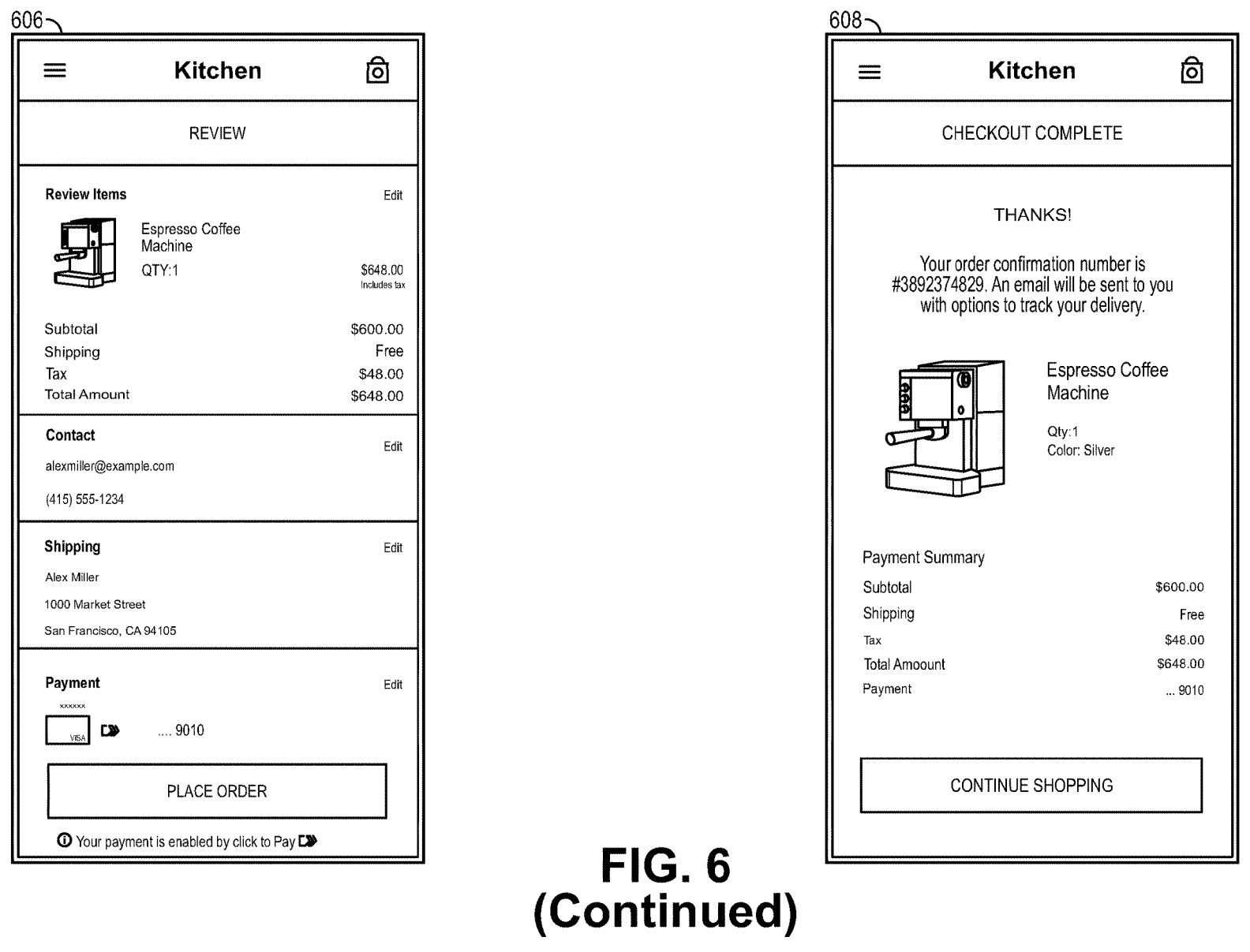

FIG. 6 shows a user experience wireframe for a user verification method according to embodiments. FIG. 6 illustrates wireframes 602-608 that represent the user experience presented to the user of the mobile device 102 during the method as illustrated in reference to FIG. 5.

The wireframe 602 illustrates an initial checkout screen that is presented to the user when the user selects to check out with selected resources on a webpage maintained by a resource provider computer. The user is presented with options to sign in or to checkout as guest. If the user decides to sign in, the user can then be presented with the wireframe 604. For example, when the user selects to sign in, the mobile device can provide a request to conduct an interaction to a secure remote computer, which can allow the mobile device to receive a list of user device identifiers, as described in the method illustrated in FIG. 5.

The wireframe 604 illustrates a checkout screen that presents the list of user device identifiers from which the user of the mobile device can select. The user can select any of the user devices and then select to continue with the interaction. For example, the mobile device can proceed with the interaction with the resource provider computer when the user selects at least one user device identifier of the list of user devices identifiers. After selecting the button to continue with the interaction, the user can be presented with the wireframe 606.

The wireframe 606 illustrates an interaction review screen that can allow the user of the mobile device to review the interaction before submitting the interaction for authorization with an authorizing entity computer. When the user selects to submit the interaction (e.g., via a place order button), the authorizing entity computer can determine whether or not to authorize the interaction, as described herein. The user can then be presented with wireframe 608 depending on the outcome of the authorization determination.

The wireframe 608 illustrates a confirmation screen that indicates to the user whether or not the interaction was authorized by the authorizing entity computer.

Embodiments of the invention have a number of advantages. Using embodiments of the invention, the user's mobile device does need to store a cookie on in order for the secure remote computer to remember the user. This is useful, since cookies can be deleted or changed, causing access issues for a user. As such, embodiments provide for a dynamic method of obtaining user identity data in real time during the interaction, without the mobile device needing to store information to aid in verification of identity data.

Embodiments provide for increased privacy since the secure remote computer, which stores the user device data, may not receive the identity data, but rather can receive the derivative of the identity data. Additionally, privacy is increased since no cookie is stored in the mobile device's browser, thus reducing tracking of the user by both honest and malicious parties.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:
1. A method comprising:
receiving, at a computer, a request to conduct an interaction from a mobile device;
after receiving the request to conduct the interaction, obtaining, by the computer, a computer address;

providing, by the computer, the computer address to the mobile device, wherein the mobile device provides an access request to the computer address, the access request thereafter being routed to an identity provider computer, wherein the identity provider computer identifies identity data associated with the mobile device or a user of the mobile device;

obtaining, by the computer, the identity data or a derivative of the identity data from the identity provider computer;

determining, by the computer, if the identity data or the derivative of the identity data matches previously stored identity data or a previously stored derivative of identity data; and if a match is determined, providing, by the computer, a list of user device identifiers, stored in association with the identity data or the derivative of the identity data, to the mobile device.

2. The method of claim 1, wherein the derivative of the identity data is a hash of a phone number, and the identity data comprises the phone number.

3. The method of claim 1, wherein the computer is a secure remote computer, wherein obtaining the computer address further comprises:

generating, by the secure remote computer, a computer address request message;

sending, by the secure remote computer, the computer address request message to a service provider computer, wherein the service provider computer generates the computer address; and receiving, by the secure remote computer, a computer address response message comprising the computer address and a key.

4. The method of claim 3, wherein obtaining the identity data or the derivative of the identity data further comprises:

generating, by the secure remote computer, an identity data result request message comprising the key;

providing, by the secure remote computer, the identity data result request message to the service provider computer; and receiving, by the secure remote computer from the service provider computer, an identity data result response message comprising the identity data or the derivative of the identity data.

5. The method of claim 1, wherein the interaction involves the mobile device and a resource provider computer, and wherein after providing the list of user device identifiers to the mobile device, the user of the mobile device selects a user device identifier of the list of user device identifiers with which to conduct the interaction, the interaction being a transaction.

6. The method of claim 1, wherein the computer is a server computer that comprises a secure remote computer and a service provider computer, and wherein the computer address is for the service provider computer, which routes the mobile device to the service provider computer.

7. The method of claim 1, wherein the computer address is a URL.

8. The method of claim 1, wherein the user device identifiers are payment card identifiers.

9. The method of claim 1, wherein the list of user device identifiers include tokens for user devices associated with the user of the mobile device.

10. A computer comprising:
a processor; and a computer-readable medium coupled to the processor, the computer-readable medium comprising code executable by the processor for implementing a method comprising:

receiving a request to conduct an interaction from a mobile device;

after receiving the request to conduct the interaction, obtaining a computer address;

providing the computer address to the mobile device, wherein the mobile device provides an access request to the computer address, the access request thereafter being routed to an identity provider computer, wherein the identity provider computer identifies identity data associated with the mobile device or a user of the mobile device;

obtaining the identity data or a derivative of the identity data from the identity provider computer;

determining if the identity data or the derivative of the identity data matches previously stored identity data or a previously stored derivative of identity data; and if a match is determined, providing a list of user device identifiers, stored in association with the identity data or the derivative of the identity data, to the mobile device.

11. The computer of claim 10, wherein the method further comprises:

obtaining a key, wherein the key is an association key that is associated with the mobile device.

12. The computer of claim 11, wherein obtaining the identity data or the derivative of the identity data further comprises:

obtaining the identity data or the derivative of the identity data using the association key.

13. The computer of claim 10, wherein the identity provider computer is one identity provider computer of a plurality of different identity provider computers.

14. The computer of claim 13, wherein the identity provider computer is a mobile wireless carrier computer.

15. The computer of claim 10, wherein the list of user device identifiers include primary account numbers.

16. The computer of claim 10, wherein the computer is a secure remote computer.

17. The computer of claim 10, wherein the computer is a server computer comprising a secure remote computer and a service provider computer.

18. A method comprising:

receiving, by a service provider computer, a computer address request message from a secure remote computer during an interaction between a mobile device and a resource provider computer;

generating, by the service provider computer, a computer address, wherein the computer address, when accessed, routes an access request to the service provider computer;

obtaining, by the service provider computer, a key that associates the mobile device with the computer address;

generating, by the service provider computer, a computer address response message comprising the computer address and the key; and providing, by the service provider computer, the computer address response message to the secure remote computer, and wherein the method further comprises:

receiving, by the service provider computer, an identity data result request message comprising the key;

determining, by the service provider computer, identity data stored in association with the key;

obtaining, by the service provider computer, a derivative of the identity data; and providing, by the service provider computer, an identity data result response message comprising the derivative of the identity data to the secure remote computer.

19. The method of claim 18 further comprising:

receiving, by the service provider computer, the access request from the mobile device via the computer address, wherein the access request includes header data;

determining, by the service provider computer, an identity provider computer of a plurality of identity provider computers based on an identity provider computer identifier included in the header data;

routing, by the service provider computer, the access request from the mobile device to the identity provider computer, wherein the identity provider computer determines identity data associated with the mobile device or a user of the mobile device that is stored by the identity provider computer in a database; and receiving, by the service provider computer, the identity data from the identity provider computer.

20. The method of claim 18, wherein the interaction is a payment transaction.

* * * * *